United States Patent
Brandvold

(10) Patent No.: US 9,080,109 B2
(45) Date of Patent: *Jul. 14, 2015

(54) METHODS FOR DEOXYGENATING BIOMASS-DERIVED PYROLYSIS OIL

(75) Inventor: Timothy A. Brandvold, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 829 days.

This patent is subject to a terminal disclaimer.

(21) Appl. No.: 13/326,059

(22) Filed: Dec. 14, 2011

(65) Prior Publication Data

US 2013/0158329 A1    Jun. 20, 2013

(51) Int. Cl.
*C07C 1/00* (2006.01)
*C10G 3/00* (2006.01)

(52) U.S. Cl.
CPC .. *C10G 3/42* (2013.01); *C10G 3/50* (2013.01); *C10G 3/45* (2013.01); *C10G 2300/44* (2013.01); *Y02E 50/14* (2013.01)

(58) Field of Classification Search
CPC .... C10G 3/50; C10G 3/47; C10G 2300/1014; C10G 2300/1048; Y02E 50/14
USPC ......... 585/240, 242; 44/605, 606; 201/21, 28, 201/29
See application file for complete search history.

(56) References Cited

U.S. PATENT DOCUMENTS

| 5,091,499 | A | 2/1992 | Chum et al. | |
| 6,143,856 | A | 11/2000 | Roy et al. | |
| 8,119,847 | B2 | 2/2012 | Dindi et al. | |
| 8,217,210 | B2* | 7/2012 | Agrawal et al. | 585/240 |
| 8,299,310 | B2 | 10/2012 | Zmierczak et al. | |
| 8,853,475 | B2* | 10/2014 | Kalnes | 585/240 |
| 2008/0050792 | A1 | 2/2008 | Zmierczak et al. | |
| 2008/0308457 | A1 | 12/2008 | Dindi et al. | |
| 2009/0082604 | A1* | 3/2009 | Agrawal et al. | 585/242 |
| 2009/0253948 | A1 | 10/2009 | McCall et al. | |
| 2009/0259082 | A1* | 10/2009 | Deluga et al. | 585/14 |
| 2010/0256428 | A1* | 10/2010 | Marker et al. | 585/240 |
| 2010/0319242 | A1 | 12/2010 | Hanks et al. | |

(Continued)

FOREIGN PATENT DOCUMENTS

WO    2011096912 A1    8/2011
WO    2011117705 A2    9/2011

OTHER PUBLICATIONS

Baker, E., et al., "Catalytic hydrotreating of biomass-derived oils," ACS Symposium Series, No. 376, p. 228-240; 1988.

(Continued)

*Primary Examiner* — Nina Bhat

(57) ABSTRACT

Methods for deoxygenating a biomass-derived pyrolysis oil are provided. A method comprising the steps of diluting the biomass-derived pyrolysis oil with a phenolic-containing diluent to form a diluted pyoil-phenolic feed is provided. The diluted pyoil-phenolic feed is contacted with a deoxygenating catalyst in the presence of hydrogen at hydroprocessing conditions effective to form a low-oxygen biomass-derived pyrolysis oil effluent.

20 Claims, 1 Drawing Sheet

(56) References Cited

U.S. PATENT DOCUMENTS

| | | |
|---|---|---|
| 2011/0047864 A1 | 3/2011 | Bhan et al. |
| 2011/0083997 A1 | 4/2011 | Silva et al. |
| 2011/0094149 A1 | 4/2011 | Weiss et al. |
| 2011/0098494 A1 | 4/2011 | Weiss et al. |
| 2011/0192072 A1 | 8/2011 | Steele et al. |
| 2012/0017493 A1* | 1/2012 | Traynor et al. ............ 44/388 |
| 2012/0017495 A1* | 1/2012 | Traynor et al. ............ 44/401 |
| 2012/0067773 A1* | 3/2012 | Ditsch .......................... 208/51 |

OTHER PUBLICATIONS

Wildschut, J., et al., "Catalyst studies on the hydrotreatment of fast pyrolysis oil," Applied Catalysis B: Environmental, vol. 99, No. 1-2, p. 298-306; Aug. 31, 2010.

Gilson, Jean-Pierre, "Characterization of HDO catalysts for their rational design," ACS National Meeting Book of Abstracts; Mar. 2011.

Search Report dated Nov. 6, 2014 for corresponding Singapore Application No. 11201402438X.

* cited by examiner

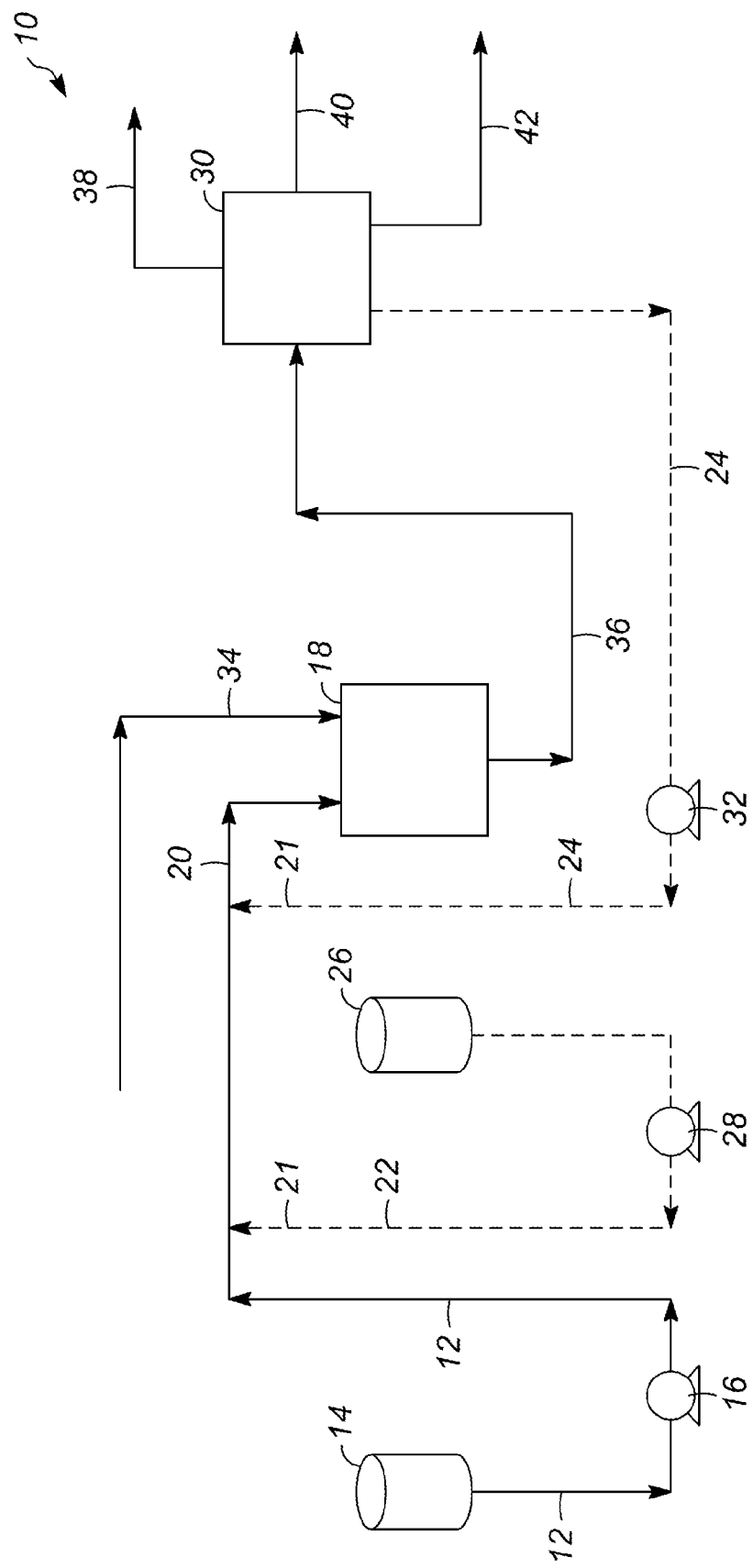

METHODS FOR DEOXYGENATING
BIOMASS-DERIVED PYROLYSIS OIL

STATEMENT REGARDING FEDERALLY
SPONSORED RESEARCH OR DEVELOPMENT

This invention was made with Government support under DE-EE0002879 awarded by the U.S. Department of Energy. The Government has certain rights in this invention.

TECHNICAL FIELD

The present invention relates generally to methods for producing biofuels, and more particularly to methods for producing low-oxygen biomass-derived pyrolysis oil from the catalytic deoxygenation of biomass-derived pyrolysis oil.

BACKGROUND

Fast paralysis is a process during which organic carbonaceous biomass feedstock, i.e., "biomass", such as wood waste, agricultural waste, algae, etc., is rapidly heated to between about 300° C. to about 900° C. in the absence of air using a pyrolysis reactor. Under these conditions, solid products, liquid products, and gaseous pyrolysis products are produced. A condensable portion (vapors) of the gaseous pyrolysis products is condensed into biomass-derived pyrolysis oil (also referred to as "pyoil"). Biomass-derived pyrolysis oil can be burned directly as fuel for certain boiler and furnace applications, and can also serve as a potential feedstock in catalytic processes for the production of fuels in petroleum refineries. Biomass-derived pyrolysis oil has the potential to replace up to 60% of transportation fuels, thereby reducing the dependency on conventional petroleum and reducing its environmental impact.

However, biomass-derived pyrolysis oil is a complex, highly oxygenated organic liquid having properties that currently limit its utilization as a biofuel. For example, biomass-derived pyrolysis oil has high acidity and a low energy density attributable in large part to oxygenated hydrocarbons in the oil, which undergo secondary reactions during storage. "Oxygenated hydrocarbons" as used herein are organic compounds containing hydrogen, carbon, and oxygen. Such oxygenated hydrocarbons in the biomass-derived pyrolysis oil include carboxylic acids, phenols, cresols, alcohols, aldehydes, etc. Conventional biomass-derived pyrolysis oil comprises about 30% by weight oxygen from these oxygenated hydrocarbons. Conversion of biomass-derived pyrolysis oil into biofuels and chemicals requires full or partial deoxygenation of the biomass-derived pyrolysis oil. Such deoxygenation may proceed via two main routes, namely the elimination of either water or $CO_2$. Unfortunately, deoxygenating biomass-derived pyrolysis oil leads to rapid plugging or fouling of the processing catalyst in a hydroprocessing reactor caused by the formation of solids from the biomass-derived pyrolysis oil. Components in the pyrolysis oil form on the processing catalysts causing catalytic bed fouling, reducing activity of the catalyst, and causing build up in the hydroprocessing reactor. It is believed that this plugging is due to thermal or acid catalyzed polymerization of the various components of the biomass-derived pyrolysis oil, e.g., second order reactions in which the various components of the oil polymerize with themselves, that create either a glassy brown polymer or powdery brown char that limits run duration and processability of the biomass-derived pyrolysis oil.

Accordingly, it is desirable to provide methods for producing a low-oxygen biomass-derived pyrolysis oil without plugging of the catalyst, thereby increasing run duration and improving processability of the biomass-derived pyrolysis oil. Furthermore, other desirable features and characteristics of the present invention will become apparent from the subsequent detailed description and the appended claims, taken in conjunction with the accompanying drawings and this background.

BRIEF SUMMARY

Methods for deoxygenating a biomass-derived pyrolysis oil are provided herein. In accordance with an exemplary embodiment, a method for deoxygenating a biomass-derived pyrolysis oil comprises the steps of diluting the biomass-derived pyrolysis oil with a phenolic-containing diluent to form a diluted pyoil-phenolic feed. The diluted pyoil-phenolic feed is contacted with a deoxygenating catalyst in the presence of hydrogen at hydroprocessing conditions effective to form a low-oxygen biomass-derived pyrolysis oil effluent.

In accordance with another exemplary embodiment, a method for deoxygenating a biomass-derived pyrolysis oil is provided. The method comprises the steps of combining a pyoil-containing stream that comprises the biomass-derived pyrolysis oil with a phenolic-containing diluent at a predetermined diluent ratio to form a diluted pyoil-phenolic feed stream. The predetermined diluent ratio is defined by a diluent mass flow rate of the phenolic-containing diluent to a pyoil mass flow rate of the pyoil-containing stream. The diluted pyoil-phenolic feed stream and a hydrogen-containing gas stream are introduced to a reactor that contains a deoxygenating catalyst and that is operating at hydroprocessing conditions effective to form a low-oxygen biomass-derived pyrolysis oil effluent.

In accordance with another exemplary embodiment, a method for deoxygenating a biomass-derived pyrolysis oil is provided. The method comprises the steps of separating a phenolic-containing diluent recycle stream from a low-oxygen biomass-derived pyrolysis oil effluent that was formed in a reactor. The reactor contains a deoxygenating catalyst and is operating at hydroprocessing conditions effective for hydroprocessing the biomass-derived pyrolysis oil in the presence of hydrogen. The phenolic-containing diluent recycle stream is combined with a pyoil-containing stream that comprises the biomass-derived pyrolysis oil at a predetermined recycle ratio to form a diluted pyoil-phenolic feed stream. The predetermined recycle ratio is defined by a recycle diluent mass flow rate of the phenolic-containing diluent recycle stream to a pyoil mass flow rate of the pyoil-containing stream. The predetermined recycle ratio is from about 1:10 to about 10:1. A hydrogen-containing gas stream and the diluted pyoil-phenolic feed stream are introduced to the reactor.

BRIEF DESCRIPTION OF THE DRAWINGS

The present invention will hereinafter be described in conjunction with the following drawing figures, wherein like numerals denote like elements, and wherein:

FIG. 1 is a block diagram of an apparatus for deoxygenating a biomass-derived pyrolysis oil in accordance with an exemplary embodiment.

DETAILED DESCRIPTION

The following Detailed Description is merely exemplary in nature and is not intended to limit the invention or the application and uses of the invention. Furthermore, there is no intention to be bound by any theory presented in the preceding background or the following detailed description.

Various embodiments contemplated herein relate to methods for deoxygenating a biomass-derived pyrolysis oil. Unlike the prior art, the exemplary embodiments taught herein produce a low-oxygen biomass-derived pyrolysis oil effluent by contacting a diluted pyoil-phenolic feed with a deoxygenating catalyst in the presence of hydrogen at hydroprocessing conditions. It should be appreciated that while the deoxygenated oil produced according to exemplary embodiments of the present invention is generally described herein as a "low-oxygen biomass-derived pyrolysis oil," this term generally includes any oil produced having a lower oxygen concentration than conventional biomass-derived pyrolysis oil. The term "low-oxygen biomass-derived pyrolysis oil" includes oil having no oxygen, i.e., a biomass-derived pyrolysis oil in which all the oxygenated hydrocarbons have been converted into hydrocarbons (i.e., a "hydrocarbon product"). Preferably, the low-oxygen biomass-derived pyrolysis oil comprises oxygen in an amount of from about 0 to about 10 weight percent (wt. %). "Hydrocarbons" as used herein are organic compounds that contain principally only hydrogen and carbon, i.e., oxygen-free. "Oxygenated hydrocarbons" as used herein are organic compounds containing hydrogen, carbon, and oxygen. Exemplary oxygenated hydrocarbons in biomass-derived pyrolysis oil include alcohols such as phenols and cresols, carboxylic acids, aldehydes, and the like.

The diluted pyoil-phenolic feed is formed by diluting the biomass-derived pyrolysis oil with a phenolic-containing diluent. The phenolic-containing diluent comprises phenolic compounds that are mutually miscible with the biomass-derived pyrolysis oil. As used herein, the term "phenolic compounds" are a class of chemical compounds that include a hydroxyl group bonded directly to an aromatic hydrocarbon group. Examples of phenolic compounds include phenol, alkylphenol such as cresol and the like, and/or other phenol substituted compounds. In an exemplary embodiment, the phenolic-containing diluent comprises phenolic compounds that are present in an amount of about 25 wt. % or greater, such as from about 50 to about 100 wt. %. In another exemplary embodiment, the biomass-derived pyrolysis oil is diluted with the phenolic-containing diluent such that diluted pyoil-phenolic feed contains from about 10 to about 90 wt. % of the biomass-derived pyrolysis oil and from about 10 to about 90 wt. % of the phenolic-containing diluent.

The inventors have found that by contacting the deoxygenating catalyst with the diluted pyoil-phenolic feed in the presence of hydrogen at the hydroprocessing conditions, the amount of glassy brown polymer or powdery brown char formed on the deoxygenating catalyst is substantially reduced or minimized relative to conventional methods. Without being limited by theory, it is believed that by diluting the biomass-derived pyrolysis oil with the phenolic-containing diluent, simple reactions of the biomass-derived pyrolysis oil with hydrogen to form a lower-oxygen biomass-derived pyrolysis oil are effectively increased and dominate while secondary polymerization reactions of biomass-derived pyrolysis oil components with themselves are reduced or minimized, thereby reducing or minimizing the formation of glassy brown polymers or powdery brown char on the deoxygenating catalyst. Therefore, a low-oxygen biomass-derived pyrolysis oil can be produced in a reactor without plugging the deoxygenating catalyst, thereby increasing run duration and improving processability of the biomass-derived pyrolysis oil.

Referring to FIG. 1, a schematic depiction of an apparatus 10 for deoxygenating a biomass-derived pyrolysis oil in accordance with an exemplary embodiment is provided. As illustrated, a pyoil-containing stream 12 that comprises the biomass-derived pyrolysis oil is stored in a storage vessel 14. The biomass-derived pyrolysis oil may be produced, such as, for example, from pyrolysis of biomass in a pyrolysis reactor. Virtually any form of biomass can be used for pyrolysis to produce a biomass-derived pyrolysis oil. The biomass-derived pyrolysis oil may be derived from biomass material, such as, wood, agricultural waste, nuts and seeds, algae, forestry residues, and the like. The biomass-derived pyrolysis oil may be obtained by different modes of pyrolysis, such as, for example, fast pyrolysis, vacuum pyrolysis, catalytic pyrolysis, and slow pyrolysis or carbonization, and the like. The composition of the biomass-derived pyrolysis oil can vary considerably and depends on the feedstock and processing variables. Examples of biomass-derived pyrolysis oil "as-produced" can contain up to about 1,000 to about 2,000 ppm total metals, about 20 to about 33 wt. % of water that can have high acidity (e.g. total acid number (TAN)>150), and a solids content of about 0.1 wt. % to about 5 wt. %. The biomass-derived pyrolysis oil may be untreated (e.g. "as produced"). However, if needed the biomass-derived pyrolysis oil can be selectively treated to reduce any or all of the above to a desired level.

In an exemplary embodiment, the biomass-derived pyrolysis oil is thermally unstable and is stored in the storage vessel 14 at a temperature close to ambient, such as from about 15 to about 50° C., to minimize secondary polymerization reactions of the various components in the biomass-derived pyrolysis oil with themselves. The pyoil-containing stream 12 is removed from the storage vessel 14 and is directed through a pump 16 towards a reactor 18. Upstream from the reactor 18, the pyoil-containing stream 12 is combined and diluted with a phenolic-containing diluent 21, which can be introduced in a single stream or in multiple separate streams, such as a phenolic-containing fresh feed stream 22 and/or a phenolic-containing diluent recycle stream 24, to form a diluted pyoil-phenolic feed 20.

In an exemplary embodiment, the phenolic-containing diluent 21 comprises phenolic compounds present in an amount of about 25 wt. % or greater, for example about 50 wt. % or greater, for example about 75 wt. % or greater, such as from about 90 to about 100 wt. %. In another exemplary embodiment, the phenolic compounds comprise phenol, methylphenol, tert-butylphenol, trimethylphenol, dimethylphenol, dimethoxyphenol, cyclopentylphenol, ethylphenol, ethyl-methylphenol, methoxyphenol, methoxy-propylphenol, methyl-isopropylphenol, propylphenol, methylpropylphenol, ethyl-methoxyphenol, methoxy-propenylphenol, dimethoxy-propenylphenol, or combinations thereof. In one example, the phenolic compounds comprise phenol, methylphenol, trimethylphenol, dimethylphenol, ethylphenol, ethyl-methylphenol, or combinations thereof. Alternatively, the phenolic-containing diluent 21 comprises a phenolic mixture derived from a biorenewable source, such as wood creosote.

In an exemplary embodiment, the pyoil-containing stream 12 is combined with the phenolic-containing diluent 21 at a predetermined diluent ratio of from about 1:10 to about 10:1 of a mass flow rate of the phenolic-containing diluent 21 to a mass flow rate of the pyoil-containing stream 12. In one example, the phenolic-containing fresh feed stream 22 is removed from a storage vessel 26, e.g., during a startup phase of the apparatus 10 as will be discussed in further detail below, and is directed through a pump 28 to the pyoil-containing stream 12 such that the predetermined diluent ratio is from about 1:10 to about 10:1 for a mass flow rate of the phenolic-containing fresh feed stream 22 to the mass flow rate of the pyoil-containing stream 12. In another example, the phenolic-containing recycle stream 24 is removed from a separation zone 30, e.g., during a continuous-operation phase of the apparatus 10 as will be discussed in further detail below, and is directed through a pump 32 to the pyoil-containing stream 12 such that a predetermined recycle ratio is from about 1:10 to about 10:1 for a mass flow rate of the phenolic-containing recycle stream 24 to the mass flow rate of the pyoil-containing stream 12. In yet another example, the predetermined diluent ratio is defined by the combined mass flow rates of the phenolic-containing fresh feed and recycle streams 22 and 24 to the mass flow rate of the pyoil-containing stream 12. Optionally, the phenolic-containing diluent 21 is heated to a temperature of from about 50 to about 150° C. and combined with the pyoil-containing stream 12 to preheat the diluted pyoil-phenolic feed 20 upstream from the reactor 18.

The diluted pyoil-phenolic feed 20 is introduced to the reactor 18. The reactor 18 can be a batch reactor or a continuous flow reactor, such as a fixed-bed reactor, a continuous stirred tank reactor (CSTR), a trickle bed reactor, an ebulliating bed reactor, a slurry reactor, or any other reactor known to those skilled in the art for hydroprocessing.

The reactor 18 contains a deoxygenating catalyst. In an exemplary embodiment, the deoxygenating catalyst comprises a metal or a combination of metals, such as a base metal(s), a refractory metal(s), and/or a noble metal(s), such as platinum, palladium, ruthenium, nickel, molybdenum, tungsten, and/or cobalt. The metal(s) may be on a support, such as a carbon support, a silica support, an alumina support, a silica-alumina support, a gamma alumina support, and/or a titanium support. Other hydroprocessing catalyst known to those skilled in the art may also be used.

A hydrogen-containing gas stream 34 is introduced to the reactor 18, which is operating at hydroprocessing conditions. In an exemplary embodiment, the hydroprocessing conditions include a reactor temperature of from about 150 to about 500° C., such as from about 200 to about 500° C., such as from about 300 to about 400° C., a reactor pressure of from about 2.76 to about 20.7 MPa gauge, a liquid hourly space velocity on a basis of volume of the biomass-derived pyrolysis oil/volume of catalyst/hour ($hr^{-1}$) of from about 0.1 to about 1 $hr^{-1}$, and a hydrogen-containing gas treat rate of from about 175 to about 2,700 standard liters of hydrogen per liter of pyrolysis oil feed (SL $H_2$/L feed).

In an exemplary embodiment, the diluted pyoil-phenolic feed 20 contacts the deoxygenating catalyst at the hydroprocessing conditions in the presence of hydrogen to form a low-oxygen biomass-derived pyrolysis oil effluent 36 by converting at least a portion of the oxygenated hydrocarbons in the biomass-derived pyrolysis oil into hydrocarbons. In particular, hydrogen from the hydrogen-containing gas stream 34 removes oxygen from the biomass-derived pyrolysis oil as water to produce the low-oxygen biomass-derived pyrolysis oil effluent 36. The oil contained in the low-oxygen biomass-derived pyrolysis oil effluent 36 may be partially deoxygenated with some residual oxygenated hydrocarbons, or may be substantially fully deoxygenated where substantially all of the oxygenated hydrocarbons are converted into hydrocarbons. It is believed that the benefits of catalytically deoxygenating the biomass-derived pyrolysis oil diluted with the phenolic-containing diluent 21, include, but are not limited to, increasing hydrogen solubility, immolation of the exotherm by dilution of the reactive species in the biomass-derived pyrolysis oil, and reducing the reaction rate of bimolecular reactants that lead to secondary polymerization reactions. As such, simple reactions of the biomass-derived pyrolysis oil with hydrogen to form a lower-oxygen biomass-derived pyrolysis oil dominate while secondary polymerization reactions of biomass-derived pyrolysis oil components with themselves are reduced or minimized, thereby reducing or minimizing the formation of glassy brown polymers or powdery brown char on the deoxygenating catalyst.

The low-oxygen biomass-derived pyrolysis oil effluent 36 is removed from the reactor 18 and is passed along to the separation zone 30. The separation zone 30 removes light volatiles, water, and light liquids from the low-oxygen biomass-derived pyrolysis oil effluent 36 using one or more separation vessels, fractionation columns, heaters, condensers exchangers, pipes, pumps, compressors, controllers, and/or the like. In an exemplary embodiment, the separation zone 30 separates the low-oxygen biomass-derived pyrolysis oil effluent 36 to form a light volatiles stream 38, a water and light liquids stream 40, a low-oxygen biomass-derived pyrolysis oil product stream 42, and optionally the phenolic-containing recycle stream 24 (e.g. streams 24 and 42 may be the same composition, but split or divided into two streams, for example). The low-oxygen biomass-derived pyrolysis oil product stream 42 may be passed along for further processing, such as hydroprocessing to further lower its oxygen content, and/or to be used, for example, as a fuel.

In an exemplary embodiment, the apparatus 10 introduces the phenolic-containing fresh feed stream 22 to the pyoil-containing stream 12 to form the diluted pyoil-phenolic feed 20 during a startup phase (e.g., during an early stage(s) of initially producing the effluent 36) of operation to produce the low-oxygen biomass-derived pyrolysis oil effluent 36. Afterwards, the phenolic-containing fresh feed stream 22 is either replaced by or supplemented with the phenolic-containing recycle stream 24 to dilute the pyoil-containing stream 12 during a continuous-operation phase (e.g., during an intermediate stage(s) of producing the effluent 36, such as when the apparatus 10 is producing a continuous flow of the low-oxygen biomass derived pyrolysis oil effluent 36 with a stable composition). Alternatively, the apparatus 10 may be operated during the startup and continuous-operation phases using the phenolic-containing fresh feed stream 22, the phenolic-containing recycle stream 24, or a combination of the phenolic-containing fresh feed and recycle streams 22 and 24.

Accordingly, methods for deoxygenating a biomass-derived pyrolysis oil have been described. Unlike the prior art, the exemplary embodiments taught herein produce a low-oxygen biomass-derived pyrolysis oil effluent by contacting a diluted pyoil-phenolic feed with a deoxygenating catalyst in the presence of hydrogen at hydroprocessing conditions. The diluted pyoil-phenolic feed is formed by diluting the biomass-derived pyrolysis oil with a phenolic-containing diluent. The phenolic-containing diluent comprises phenolic compounds that are mutually miscible with the biomass-derived pyrolysis oil. It has been found that by contacting the deoxygenating catalyst with the diluted pyoil-phenolic feed in the presence of hydrogen at the hydroprocessing conditions, the amount of glassy brown polymer or powdery brown char formed on the deoxygenating catalyst is substantially reduced or minimized relative to conventional methods. Therefore, a low-oxygen biomass-derived pyrolysis oil can be produced in a reactor without plugging the deoxygenating catalyst, thereby increasing run duration and improving processability of the biomass-derived pyrolysis oil.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for deoxygenating a biomass-derived pyrolysis oil, the method comprising the steps of:
diluting the biomass-derived pyrolysis oil with a phenolic-containing diluent to form a diluted pyoil-phenolic feed; and
contacting the diluted pyoil-phenolic feed with a deoxygenating catalyst in the presence of hydrogen at hydroprocessing conditions effective to form a low-oxygen biomass-derived pyrolysis oil effluent.

2. The method of claim 1, wherein the step of diluting comprises diluting the biomass-derived pyrolysis oil with the phenolic-containing diluent that comprises phenolic compounds present in an amount of about 25 wt. % or greater of the phenolic-containing diluent.

3. The method of claim 1, wherein the step of diluting comprises diluting the biomass-derived pyrolysis oil with the phenolic-containing diluent that comprises phenolic compounds present in an amount of from about 50 to about 100 wt. % of the phenolic-containing diluent.

4. The method of claim 1, wherein the step of diluting comprises forming the diluted pyoil-phenolic feed comprising the biomass-derived pyrolysis oil that is present in an amount of from about 10 to about 90 wt. % of the diluted pyoil-phenolic feed.

5. The method of claim 1, wherein the step of diluting comprises diluting the biomass-derived pyrolysis oil with the phenolic-containing diluent that comprises a phenolic mixture derived from a biorenewable source including wood creosote.

6. The method of claim 1, wherein the step of diluting comprises diluting the biomass-derived pyrolysis oil with the phenolic-containing diluent that comprises phenol, methylphenol, tert-butylphenol, trimethylphenol, dimethylphenol, dimethoxyphenol, cyclopentylphenol, ethylphenol, ethyl-methylphenol, methoxyphenol, methoxy-propylphenol, methyl-isopropylphenol, propylphenol, methyl-propylphenol, ethyl-methoxyphenol, methoxy-propenylphenol, dimethoxy-propenylphenol, or combinations thereof.

7. The method of claim 1, wherein the step of diluting comprises diluting the biomass-derived pyrolysis oil with the phenolic-containing diluent that comprises phenol, methylphenol, trimethylphenol, dimethylphenol, ethylphenol, ethyl-methylphenol, or combinations thereof.

8. The method of claim 1, wherein the step of contacting comprises contacting the diluted pyoil-phenolic feed at the hydroprocessing conditions that include a reactor temperature of from about 150 to about 500° C.

9. The method of claim 1, wherein the step of contacting comprises contacting the diluted pyoil-phenolic feed at the hydroprocessing conditions that include a reactor pressure of from about 2.76 to about 20.7 MPa gauge.

10. The method of claim 1, further comprising the step of:
separating and recycling a phenolic-containing portion from the low-oxygen biomass-derived pyrolysis oil effluent to form at least a portion of the phenolic-containing diluent.

11. A method for deoxygenating a biomass-derived pyrolysis oil, the method comprising the steps of:
combining a pyoil-containing stream that comprises the biomass-derived pyrolysis oil with a phenolic-containing diluent at a predetermined diluent ratio to form a diluted pyoil-phenolic feed stream, wherein the predetermined diluent ratio is defined by a diluent mass flow rate of the phenolic-containing diluent to a pyoil mass flow rate of the pyoil-containing stream; and
introducing the diluted pyoil-phenolic feed stream and a hydrogen-containing gas stream to a reactor that contains a deoxygenating catalyst and that is operating at hydroprocessing conditions effective to form a low-oxygen biomass-derived pyrolysis oil effluent.

12. The method of claim 11, wherein the step of combining comprises combining the pyoil-containing stream with the phenolic-containing diluent at the predetermined diluent ratio of from about 1:10 to about 10:1.

13. The method of claim 11, wherein the step of combining comprises combining the pyoil-containing stream with the phenolic-containing diluent that comprises a phenolic-containing diluent fresh feed stream.

14. The method of claim 11, wherein the step of introducing comprises introducing the hydrogen-containing gas stream to the reactor such that the hydroprocessing conditions include a hydrogen-containing gas treat rate of from about 175 to about 2,700 SL $H_2$/L feed.

15. The method of claim 11, wherein the step of introducing comprises introducing the diluted pyoil-phenolic feed stream to the reactor such that the hydroprocessing conditions include a liquid hourly space velocity on a basis of volume of the biomass-derived pyrolysis oil per volume of catalyst of from about 0.1 to about 1 $hr^{-1}$.

16. The method of claim 11, wherein the step of combining comprises introducing the pyoil-containing stream that has a temperature of from about 15 to about 50° C. to the phenolic-containing diluent.

17. The method of claim 11, wherein the step of combining comprises introducing the pyoil-containing stream to the phenolic-containing diluent that has a temperature of from about 50 to about 150° C.

18. The method of claim 11, further comprising the steps of:
introducing the low-oxygen biomass-derived pyrolysis oil effluent to a separation zone to separate a phenolic-containing portion from the low-oxygen biomass-derived pyrolysis oil effluent; and
recycling the phenolic-containing portion to form at least a portion of the phenolic-containing diluent.

19. The method of claim 18, wherein the step of introducing the low-oxygen biomass-derived pyrolysis oil effluent comprises removing water.

20. A method for deoxygenating a biomass-derived pyrolysis oil, the method comprising the steps of:
separating a phenolic-containing diluent recycle stream from a low-oxygen biomass-derived pyrolysis oil effluent that was formed in a reactor that contains a deoxygenating catalyst and that is operating at hydroprocessing conditions effective for hydroprocessing the biomass-derived pyrolysis oil in the presence of hydrogen;
combining the phenolic-containing diluent recycle stream with a pyoil-containing stream that comprises the biomass-derived pyrolysis oil at a predetermined recycle ratio to form a diluted pyoil-phenolic feed stream, wherein the predetermined recycle ratio is defined by a recycle diluent mass flow rate of the phenolic-containing diluent recycle stream to a pyoil mass flow rate of the pyoil-containing stream, wherein the predetermined recycle ratio is from about 1:10 to about 10:1; and
introducing a hydrogen-containing gas stream and the diluted pyoil-phenolic feed stream to the reactor.

* * * * *